United States Patent [19]
Robinson et al.

[11] 3,921,039
[45] Nov. 18, 1975

[54] SEISMIC RESISTANT STRUCTURE FOR A CAPACITOR BANK

[75] Inventors: Arthur R. Robinson; David A. W. Pecknold, both of Urbana; William Hamilton Walker, Champaign, all of Ill.

[73] Assignee: Sangamo Electric Company, Springfield, Ill.

[22] Filed: Mar. 1, 1974

[21] Appl. No.: 447,148

[52] U.S. Cl. ............... 317/103; 174/148; 248/358 R
[51] Int. Cl.² ............................................. H02B 1/04
[58] Field of Search ..... 248/358 R; 52/167; 317/99, 317/103; 174/148, 150; 317/242, 256, 260

[56] References Cited
UNITED STATES PATENTS

| | | | |
|---|---|---|---|
| 2,106,616 | 1/1938 | McCoy | 174/148 |
| 3,069,521 | 12/1962 | Roxburgh | 174/148 |
| 3,265,934 | 8/1966 | Cuttino | 317/103 |
| 3,689,809 | 9/1972 | McDonald | 317/99 |
| 3,794,277 | 2/1974 | Smedley | 174/161 R |

*Primary Examiner*—Gerald P. Tolin
*Attorney, Agent, or Firm*—Johnson, Dienner, Emrich & Wagner

[57] ABSTRACT

A capacitor stack embodying a seismic resistant structural support assembly including a frame structure having at least one level or rack of individual capacitors supported thereby and four splayed support legs. Adaptors are connected at opposite ends of each support leg for connecting the legs between the frame and a relatively flat ground surface. EAch support leg is in an inclined relation to the frame, whereby the line of action of each leg is directed toward the approximate center of gravity of the stack.

4 Claims, 3 Drawing Figures

Fig. 3

Fig. 2

SEISMIC RESISTANT STRUCTURE FOR A CAPACITOR BANK

BACKGROUND OF THE INVENTION

This invention relates to a capacitor stack and, in particular, a capacitor stack having a structural support assembly which is constructed so as to adequately resist the loading produced by the seismic shocks of earthquakes with a relatively high factor of safety.

During an emergency condition, the supply of electrical power to facilities, such as communication installations, health and sanitary establishments, as well as crime prevention systems is highly important. Obviously, lack of electrical power for such facilities, during an emergency or disaster will create serious problems in a community.

In a conventional electrical power supply system, power is generated at a generating plant and transmitted in high voltage transmission lines to a plurality of power distribution sub-stations that are located in the areas to be served. Each power distribution sub-station will usually include a plurality of capacitors which are supported in a bank above the ground by a structural support assembly. Further, the capacitor stacks are usually comprised of several layers or racks of capacitors and this arrangement tends to make the assembly less stable along its horizontal dimension as opposed to its vertical dimension. Additionally, these typical capacitor stacks are extremely heavy and often weigh in the order of 3 tons or more.

The structural support assemblies in prior art assemblies are generally comprised of a structural support frame and four parallel upright support legs, normally made of a non-conducting ceramic type electrical insulating material. Such legs must of necessity support the considerable loads imposed thereon. It has been found that with the occurrence of earthquakes, such support legs constitute a vulnerable point in the system. The seismic shocks produced by the earthquakes subject the entire support assembly including the parallel upright insulator support legs to relatively large lateral and vertical dynamic loadings. As aforementioned, these vertically arranged capacitor racks provide a structure which is somewhat less stable along its horizontal dimension and consequently when the structural support assembly experiences the increased seismic loadings there is a corresponding increase in structural stress concentrations which thereby create a condition, wherein the support assembly and, particularly, the insulator support legs may collapse.

Furthermore, since, as aforementioned, the parallel upright insulator support legs are structurally the weakest member in the overall structural support assembly, it has been also determined that under earthquake type loading, parallel upright insulator support legs possess certain desired characteristics. As a result of these characteristics, and coupled with the vigorous and large movements of the capacitor stack during a seismic shock, large forces at its natural frequency result, thereby the possibility of failure is increased. In addition, parallel upright insulator supports normally have relatively small reserve loading capacity. Thus, the conventional capacitor stacks embodying the parallel upright insulator support legs are subject to several disadvantages, as previously noted, and provide a structural support assembly which does not provide a particularly high factor of safety under earthquake type loading.

In an effort to overcome structural disadvantages inherent with conventional support assemblies embodying four parallel support legs, an approach taken in the field consists of adding extra upright insulator support legs to the support frame, thereby reducing the load each leg would be required to support under seismic loadings. While such a proposal is somewhat practical and expedient, it nevertheless creates additional problems. If it is considered that insulators are by nature not perfect in their performance of inhibiting all electrical flow, it becomes readily apparent that an increase in the number of insulator support legs correspondingly decreases the effectiveness of the insulator support legs, taken collectively, to inhibit the undesired flow of electricity from the capacitors to the ground surface.

Additional disadvantages resulting from the use of extra insulator support legs would be their added cost, as well as their cluttered appearance, which also results in the tendency of said added legs to hamper service and maintenance of the capacitor rack. Further, in many instances additional foundation would be required for the extra legs.

SUMMARY OF THE INVENTION

Accordingly, an object of the present invention is to overcome the aforementioned disadvantages prevalent in the prior art pertaining to support assemblies for capacitor stacks by providing a structural support assembly which is not only more resistant to seismic shocks due to a factor of safety significantly higher than is present in existing capacitor stacks but also to a structural support assembly which promotes such increased safety without increasing the leakage of electrical energy to ground from the capacitor stacks.

It is another object of the present invention to provide a structural support assembly for capacitor stacks which is relatively less costly and uncluttered in construction.

It is another object of the present invention to provide a structural support assembly for a capacitor stack wherein relatively low stress concentrations result during lateral and vertical loadings of seismic shocks, whereby the support assembly possesses a relatively high lateral load capacity.

It is another object of the present invention to provide a structure of such type in which the insulator support legs of the structural support assembly which possess relatively high structural stiffness and a relatively high reserve load capacity when subjected to the static and dynamic loads of seismic shocks.

In order to accomplish the aforementioned objects, a structural support assembly for the capacitor stack includes a support frame structure which is effective to support a plurality of individual capacitors, suitably interconnected with each other, and four inclined insulator support legs arranged in a splayed relation to the frame structure. Each inclined insulator support leg has basically a three piece construction with one end thereof connected to the support frame and the opposite end, preferably, connected to a generally level ground surface. Each of the splayed inclined insulator support legs are sloped at an angle and in a direction which extends generally downwardly and outwardly relative to the frame structure so that the line of action for each leg is directed toward the approximate center of gravity for the capacitor stack. The inclined insulator support legs thus resist lateral loads primarily by tension and compression rather than by pending as in the case with parallel upright insulator legs. Bending creates large tension stress concentrations and produces premature failure of the porcelain insulators, typically at porcelain-cement contacts. Adaptor members secured at opposite ends of each inclined insulator support leg are interposed between the frame structure and ground surface, respectively, for insuring that the line of action of each support leg is coincident with the latter's longitudinal axis. Thusly, each support leg is comprised of essentially a three-piece construction. It is preferable to have the lower adaptor have a length which is larger relative to the upper adaptor.

These and other objects, features, and advantages of the preferred embodiment of the present invention will become apparent when considered in conjunction with the accompanying drawings, wherein like reference numerals indicate like structure throughout several figures.

BRIEF DESCRIPTION OF THE DRAWINGS

FIG. 2 is a side elevational view illustrating the capacitor stack arrangement as shown in FIG. 1; and FIG. 3 is an end view of the capacitor stack arrangement as shown in FIGS. 1 and 2.

DESCRIPTION OF THE PREFERRED EMBODIMENT

Figure 1:
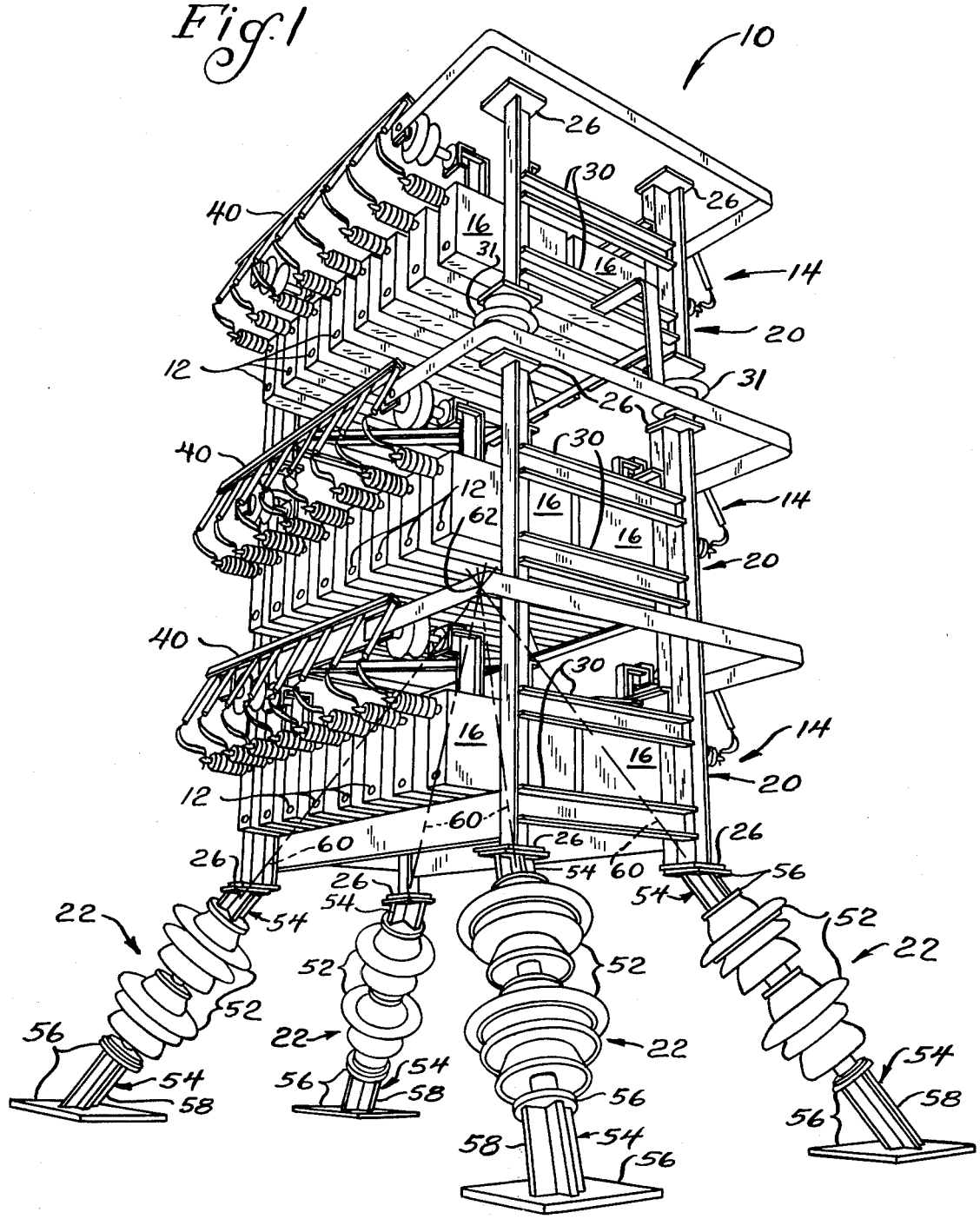
FIG. 1 is a perspective view illustrating a capacitor stack arrangement made in accordance with the principles of the present invention.
Figures 2, 3:
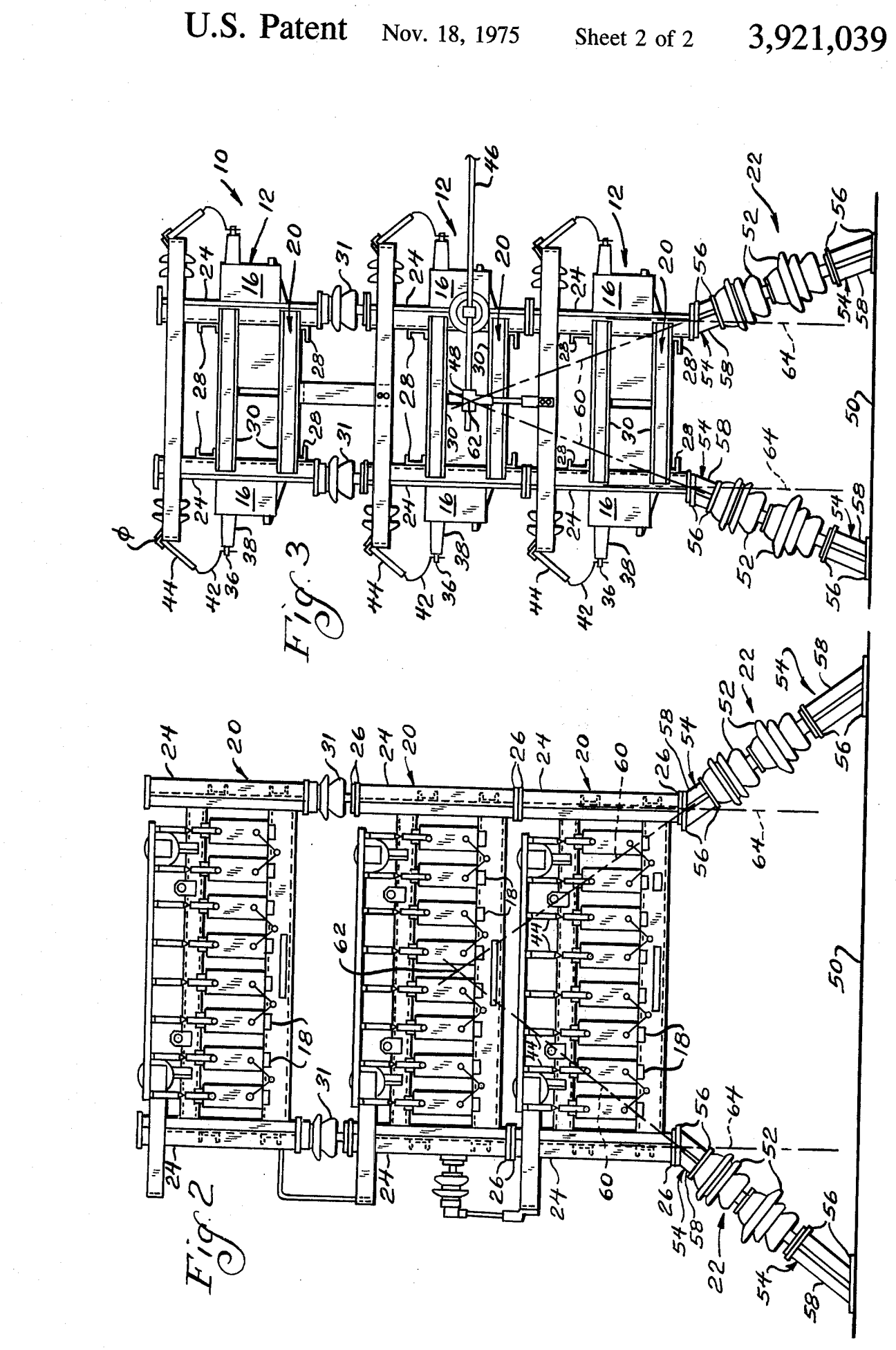

Referring to the FIGS. 1 to 3 of the drawings, there is disclosed a capacitor stack embodying the principles of the present invention and generally designated by reference numeral 10. The capacitor stack 10 in the preferred embodiment being described comprises a three-tiered rack arrangement of a plurality of individual capacitors 12, conventionally arranged together and mounted on and supported by a structural support assembly 14. While the principles of the present invention are to be hereinafter described in conjunction with a three-tiered capacitor rack arrangement it is stressed that these principles can be effectively applied to capacitor stacks having any number of tiers or racks of capacitors. Also, the capacitor stack of the present invention can be suitably connected with two other capacitor stacks to form a capacitor bank. By definition as used throughout the application, a capacitor stack is comprised of one or more racks of capacitors and a capacitor bank may be comprised of one or more capacitor stacks.

Each of the capacitors 12 is of a known metallic construction having a generally box-like shaped casing 16 which hermetically seals each of the capacitor's respective plates (not shown) and electrode assembly (not shown) which are both mounted within the casing. Brackets 18 or some other conventional securing device are used to detachably secure the capacitors 12 to the structural support assembly 14.

The structural support assembly 14 includes a horizontally disposed support frame 20 for each of the respective racks of capacitors 12 and, four inclined structural insulator support legs 22 secured to the lowermost of the support frames 20.

Desirably, each support frame 20 is constructed from an aluminum alloy as to be light weight and able to withstand outdoor usage. However, other suitable materials can also be used. Each support frame 20 includes a plurality of corner upright support members 24. Opposite ends of each of the upright corner support members 24 are provided with flat surface corner plates 26. Connected, as by welding, to an between the upright corner support members 24 are a pair of upper and lower, channel constructed, horizontal frame support members 28, 28', respectively (FIG. 3). Suitably attached adjacent opposite ends of the horizontal frame support members 28 are a pair of channel constructed end frame members 30 (FIGS. 1 and 3) which serve to add to the overall rigidity of each of the structural support frames 20. The aforedescribed arrangement results in a structural support assembly 14 which provides a secure and reliable support for the capacitors 12.

The corner plates 26 located between the lowermost and intermediate support frames 20 abut each other and are fastened together in a conventional fashion. Corner plates 26 located between the intermediate and upper support frames 20 have interposed therebetween conventionally constucted insulators 31 which may be fabricated from any suitable ceramic material, such as porcelain.

A detailed description of the electrical connections required for the capacitor stack 10 is not believed necessary for a complete understanding of the present invention. It is to be understood, however, that such connections as shown in the drawings (and specifically FIG. 3) are typical of conventional electrical connections used in capacitor stacks. As shown in FIG. 3, three racks are connected in series to make up one-phase of a three-phase bank. Each capacitor 12 has a voltage terminal 36 centrally supported within an insulated bushing 38 and connected to a bus bar 40 through a corresponding flipper spring 42 and expulsion fuse 44. The bus bar 40 at the top of each of such stack is in turn operatively connected to the conductors of a distribution line (not shown). The bus 46 located at the approximate center of the stacks in FIG. 3 is the neutral bus which connects to the neutral of each of two additional stacks also not shown, for the other two phases for the bank. It should be noted, that all the electrical bus bar connections can be treated with a corrosive inhibiting compound and that a T-connection 48, if desired, can be used to connect a single capacitor stack 10 to other capacitor stack neutrals to form a three-phase bank.

Each of the inclined insulator structural support legs 22 is basically a three-element construction, wherein each leg is connected between the bottom of the lowermost of the support frames 20 and a, preferably, generally level surface 50. Ideally, the surface 50 should be made of single reinforced concrete foundation. As is normally the case, the foundation support is preferably poured to be integral so that forces exerted by the legs in the horizontal plane which might attempt to spread the foundation will be resisted. As is common in the utility industry, the insulator support legs 22 have an intermediate section 52 fabricated from a suitable ceramic material, such as porcelain, which acts as an insulator to inhibit undesired leakage of electricity from the capacitors 12 to the ground surface 50.

Adaptor members 54 are made of a suitable structural material such as an aluminum alloy and are appropriately secured to opposite ends of the inclined insulator support legs 22 to connect the respective ends thereof with the bottom corner plates 26 of the lowermost support frame 20 and the ground surface 50, respectively. Each adaptor member 54 is essentially comprised of spaced and generally planar attachment members 56 having any desired configuration. In the embodiment being presently described, the innermost of the attachment members 56, or those fastened to each of the respective insulator sections 52, have a substantially circular configuration (FIG. 1), whereas the outermost of the attachment members attached to the corner plates 26 have a configuration substantially similar to those of the generally square corner plates 26. Interposed and suitably secured between the attachment members 56 are structural support members 58 which in cross-section, in this example, are cross-shaped. The longitudinal axis of each of these support members 58 is at an angle inclined to the vertical and corresponds to the angle of inclination of each of the insulator support legs which angle is to be hereinafter described. It should be noted, however, that the lower adaptor 54 or the adaptor in contact with the foundation has the length of its support member 58 longer than that of the support member for the upper adapter 54.

As previously mentioned, the inclined insulator support legs 22 are in a splayed relationship relative to the lowermost support frame 20 and therefore slope downwardly and outwardly relative to the bottom corners plates 26 thereof. Each line of action 60 coincident with the longitudinal axis of the leg is so arranged that the lines of action of all of the inclined insulator support legs 22 are directed toward the approximate center of gravity 62 of the capacitor stack. The significance of this latter relationship will be subsequently discussed. In order that each line of action 60 for a respective inclined insulator support leg 22 passes as close as possible to the center of gravity 62, each insulator support leg must be properly angularly oriented relative to the support assembly 14.

By definition each of the insulator support legs 22 is located with its centerline at a predetermined angle of inclination which is measured relative to a vertical line 64 that is located in a vertical plane which passes through the center of the respective corners 26. This predetermined angle is determined by seeking to locate the lines of action 60 so as to converge at the approximate center of gravity 62 of the stack 10 (or rack as the case may be) which as mentioned, may vary for practical purposes without departing from the spirit of the invention.

The aforedescribed relationship of seeking coincidence of the lines of action 60 at the center of gravity 62 has been found to result in not only a more rigid structural support assembly 14, especially under earthquake type loading, but also and just as importantly, one which still permits use of only four insulator support legs thereby minimizing the undesired leakage of electrical energy from capacitors 12 to ground surface 50.

The following is a detailed description of an embodiment of a capacitor stack 10 which is installed in the field. This description is offered for purposes of illustration and is not to be construed as limitation to the invention. In a three-tiered capacitor stack arrangement the capacitor stack 10 extends approximately 13 feet above ground surface 50. When viewing FIG. 3, insulator support legs 22 are spaced apart from each other, at ground surface, by a distance of almost 6 feet, whereas in that shown of FIG. 2 the spacing of legs 22 is approximately 9½ feet. Each rack of capacitors 12 weigh approximately 2200 pounds and the total weight of the capacitor stack 10 is approximately 3 tons. With the above arrangement, the center of gravity 62 is located at about 7½ feet above the ground surface 50. In order to insure that the lines of action 60 are directed at the approximate center of gravity 62, the angle of inclination of the centerline 60 of each of the insulator support legs 22 relative to a vertical centerline 64 which, as aforementioned, is located in a vertical plane which bisected the supports 26 by such legs is 30°.

The capacitor stack 10 of the preferred embodiments has been tested under conditions which approximate the increased static and dynamic loadings which occur during an earthquake. Results have indicated that four inclined insulator support legs 22 located, preferably, at each of the bottom corner plates 26 of the lowermost support frame 20 and so arranged that the line of action 60 of each leg is directed at a point which preferably is close to the center of gravity 62, according to the teachings of the invention, reduces the tension stress concentration within the support assembly 14. By reducing the tension stress concentrations within the structural support assembly 14, the lateral load capacity for the structure is increased to a level wherein increased lateral loads caused by the seismic shocks are significantly more adequately withstood.

Additionally, the preferred arrangement of the inclined insulator support legs 22, as disclosed, has also significantly increased the lateral structural stiffness for each of the legs 22. The greater structural stiffness further enhances the ability of the structural support assembly 14 to resist significant forces brought about by the pronounced excitations and vibrations of earthquakes. These results are even more significant, when it is considered that the inclined support legs 22 are normally fabricated of a ceramic material which must support the rather heavy and rather laterally unstable capacitor stack 10. While the configuration of the support frames 20 herein disclosed, have been generally box-like, it is to be understood that other types of configurations for the support frames can be adequately supported. Additionally, although the preferred embodiment disclosed four inclined support legs 22, it is to be appreciated that the present invention can adequately function if additional insulator legs are provided, so long as the lines of action for each of the additional legs passes approximately through the coincident point formed by the original four legs.

The preferred embodiment herein discussed and described provides a structural support assembly for a capacitor stack which has a higher factor of safety under earthquake type loadings than the conventional structural support assemblies, while at the same time forecloses the necessity of using additional insulator support legs.

We claim:

1. A capacitor stack including at least one horizontally disposed box-like structural support frame which securely supports a plurality of capacitors, a plurality of support means supporting said support frame on a generally flat base surface, each of said support means including an elongated ceramic insulator section, and a first and a second metal adaptor means, said first adaptor means attaching one end of said insulator section to a bottom portion of said horizontally disposed support frame, and said second adaptor means attaching the opposite end of said insulator section to said flat base surface, each of said support means being located at each of the four corners of said support frame and being oriented in a direction which extends generally downwardly and outwardly from the bottom portion of said support frame in a splayed relationship thereto, said first and second adaptor means of each support means aligning and corresponding insulator section so that the longitudinal axis of the insulator section is coincident with a centerline or line of action for each one of said support means, which is directed toward and in close proximity to the center of gravity of said capacitor stack.

2. A capacitor stack as defined in claim 1 wherein each of said first and second adaptor means includes spaced outermost and innermost attachment members and a structural support member angularly interposed between said outermost and innermost attachment members and interconnecting said outermost and innermost members, said outermost member of said first adaptor means being connected to the bottom portion of said support frame, and said innermost member of said first adaptor means being connected to said one end of said insulator section, and said outermost member of said second adaptor means being connected to said flat base surface, and said innermost member of said second adaptor means being connected to the opposite end of said insulator section.

3. A capacitor stack as defined in claim 1 wherein each of said structural support members has a cross-shaped cross section.

4. A capacitor stack as defined in claim 1 in which one of said adaptor means has a longer dimension than said other adaptor means.

* * * * *

UNITED STATES PATENT AND TRADEMARK OFFICE
CERTIFICATE OF CORRECTION

PATENT NO. : 3,921,039

DATED : November 18, 1975

INVENTOR(S) : Arthur R. Robinson, David A.W. Pecknold, and William Hamilton Walker It is certified that error appears in the above-identified patent and that said Letters Patent are hereby corrected as shown below:

Column 8, line 10, "Claim 1" should be -- Claim 2 --.

Signed and Sealed this second Day of March 1976

[SEAL]

Attest:

RUTH C. MASON
Attesting Officer

C. MARSHALL DANN
Commissioner of Patents and Trademarks